United States Patent
Nomura

(10) Patent No.: US 9,533,579 B2
(45) Date of Patent: Jan. 3, 2017

(54) ELECTRONIC CONTROL APPARATUS FOR ELECTRICALLY-DRIVEN VEHICLE

(71) Applicant: DENSO CORPORATION, Kariya, Aichi-pref. (JP)

(72) Inventor: Syunsuke Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/536,877

(22) Filed: Nov. 10, 2014

(65) Prior Publication Data
US 2015/0221145 A1    Aug. 6, 2015

(30) Foreign Application Priority Data

Jan. 31, 2014 (JP) .................................. 2014-16776

(51) Int. Cl.
*B60W 50/04*    (2006.01)
*B60L 3/12*    (2006.01)
(Continued)

(52) U.S. Cl.
CPC ................ *B60L 3/12* (2013.01); *B60L 3/0046* (2013.01); *B60L 3/0053* (2013.01); *B60L 3/0061* (2013.01);
(Continued)

(58) Field of Classification Search
USPC ........................... 701/29.1, 29.2; 180/65.265
See application file for complete search history.

(56) References Cited

U.S. PATENT DOCUMENTS

| | | | |
|---|---|---|---|
| 4,564,916 A | * | 1/1986 | Hori ..................... G07C 5/0808 123/198 D |
| 5,454,259 A | | 10/1995 | Ishii et al. |

(Continued)

FOREIGN PATENT DOCUMENTS

| | | |
|---|---|---|
| JP | 62-001651 A | 1/1987 |
| JP | 62-131343 A | 6/1987 |

(Continued)

OTHER PUBLICATIONS

OBD-Codes, (http://www.obd-codes.com/forums/viewtopic.php?t=3671) posted May 23, 2008, last accessed Nov. 3, 2015.*

(Continued)

*Primary Examiner* — Thomas Tarcza
*Assistant Examiner* — Richard Goldman
(74) *Attorney, Agent, or Firm* — Posz Law Group, PLC

(57) ABSTRACT

An electronic control apparatus controls am electrically-driven vehicle, which has no engine but has only a motor supplied with electric power from an electric power supply source. The electronic control apparatus has a self-diagnosis function for storing an abnormality code corresponding to a diagnosis object when abnormality of the diagnosis object is detected. The electronic control apparatus checks whether the motor and the electric power supply source are operating normally when a power control switch is turned on under a state that the abnormality code is stored in a memory. The electronic control apparatus checks whether abnormality is detected again in the diagnosis object, the abnormality code of which has already been stored, when the motor and the electric power supply source are operating normally. The electronic control unit erases the abnormality code when no abnormality is detected again.

11 Claims, 3 Drawing Sheets

(51) Int. Cl.
  *B60L 11/18* (2006.01)
  *B60L 3/00* (2006.01)
  *G07C 5/08* (2006.01)
  *B60L 7/14* (2006.01)
  *B60L 15/20* (2006.01)

(52) U.S. Cl.
  CPC .............. *B60L 7/14* (2013.01); *B60L 11/1861* (2013.01); *B60L 11/1887* (2013.01); *B60L 11/1888* (2013.01); *B60L 15/20* (2013.01); *B60L 15/2009* (2013.01); *G07C 5/085* (2013.01); *B60L 2210/14* (2013.01); *B60L 2220/14* (2013.01); *B60L 2240/12* (2013.01); *B60L 2240/421* (2013.01); *B60L 2240/423* (2013.01); *B60L 2240/425* (2013.01); *B60L 2250/26* (2013.01); *Y02T 10/645* (2013.01); *Y02T 10/705* (2013.01); *Y02T 10/7044* (2013.01); *Y02T 10/7225* (2013.01); *Y02T 10/7275* (2013.01); *Y02T 90/34* (2013.01)

(56) References Cited

U.S. PATENT DOCUMENTS

| | | | |
|---|---|---|---|
| 5,671,141 A * | 9/1997 | Smith | F02D 41/22 701/1 |
| 6,672,415 B1 | 1/2004 | Tabata | |
| 7,558,655 B2 * | 7/2009 | Garg | B60K 6/32 701/32.8 |
| 8,406,951 B2 * | 3/2013 | Suganuma | G05B 23/0264 701/33.4 |
| 2001/0008987 A1 | 7/2001 | Wada et al. | |
| 2004/0031452 A1 | 2/2004 | Yamazaki | |
| 2004/0219409 A1 | 11/2004 | Isogai | |
| 2005/0247123 A1 | 11/2005 | Fuse | |
| 2006/0224283 A1 * | 10/2006 | Fussey | F02D 41/22 701/31.4 |
| 2009/0281689 A1 | 11/2009 | Suganuma et al. | |
| 2009/0299561 A1 * | 12/2009 | Matsumoto | B60K 6/28 701/22 |
| 2010/0204864 A1 | 8/2010 | Ando et al. | |
| 2010/0209794 A1 | 8/2010 | Kajiwara et al. | |
| 2010/0313849 A1 * | 12/2010 | Stoner | F02D 41/22 123/350 |
| 2011/0089905 A1 | 4/2011 | Yano | |
| 2012/0166040 A1 * | 6/2012 | Hwang | G05B 19/0423 701/33.4 |
| 2012/0185126 A1 * | 7/2012 | Wang | B60R 16/0232 701/32.9 |
| 2013/0218403 A1 * | 8/2013 | Abe | B60R 16/03 701/32.8 |
| 2013/0341109 A1 | 12/2013 | Ozaki | |
| 2014/0300739 A1 * | 10/2014 | Mimar | H04N 7/188 348/148 |
| 2014/0379204 A1 * | 12/2014 | Goto | G01D 5/24457 701/31.7 |
| 2014/0379206 A1 * | 12/2014 | Martin | G01M 15/02 701/32.8 |
| 2014/0379209 A1 * | 12/2014 | Matsuda | B60L 15/20 701/34.2 |
| 2015/0112541 A1 * | 4/2015 | Kakinuma | G07C 5/008 701/31.5 |
| 2015/0206360 A1 * | 7/2015 | Schnurr | B60W 50/0097 701/29.1 |
| 2015/0217641 A1 * | 8/2015 | Slosarczyk | H02J 7/1423 701/22 |
| 2015/0221145 A1 * | 8/2015 | Nomura | B60L 11/1888 701/31.7 |

FOREIGN PATENT DOCUMENTS

| | | |
|---|---|---|
| JP | 2000-179375 A | 6/2000 |
| JP | 2000-243422 A | 9/2000 |
| JP | 2002-002418 A | 1/2002 |
| JP | 2003-293770 A | 10/2003 |
| JP | 2003-314279 A | 11/2003 |
| JP | 2004-158279 A | 6/2004 |
| JP | 2005-083614 A | 3/2005 |
| JP | 2006-322407 A | 11/2006 |
| JP | 2009-247205 A | 10/2009 |
| JP | 2010-238450 A | 10/2010 |
| JP | 2013-204371 A | 10/2013 |

OTHER PUBLICATIONS

Bai Wenjie et al., "Modelling the Condition Diagnosis System of Electric Vehicle with Object-oriented Technology", Journal of Asian Electric Vehicles, Japan, Union Press, vol. 1, No. 1, p. 139-144, Feb. 2003.

Office Action issued Feb. 9, 2016 in the corresponding JP application No. 2014-016776 (with English translation).

* cited by examiner

ELECTRONIC CONTROL APPARATUS FOR ELECTRICALLY-DRIVEN VEHICLE

CROSS REFERENCE TO RELATED APPLICATION

This application is based on Japanese patent application No. 2014-16776 filed on Jan. 31, 2014, the disclosure of which is incorporated herein by reference.

TECHNICAL FIELD

The present disclosure relates to an electronic control apparatus, which controls an electrically-driven vehicle having, as a drive power source for travel, no engine but an electric motor supplied with electric power from an electric power source, and has a self-diagnosis function.

BACKGROUND ART

As disclosed in JP-A-H07-83867 (U.S. Pat. No. 5,454,259), a conventional electronic control apparatus controls a vehicle having an engine as a drive power source for vehicle travel and has a self-diagnosis function.

This electronic control apparatus is configured to store an abnormality code corresponding to a diagnosis object or item at the time of detection of abnormality of the diagnosis object. The electronic control apparatus is configured to erase the abnormality code when the abnormality is not detected again during a period, in which a warm-up operation (warm-up cycle) is repeated a predetermined number of times (e.g., 40 times). Since the abnormality code stored as a result of temporary abnormality can be erased, maintenance of a vehicle can be improved.

As for a vehicle having an engine, as described above, OBD-II regulation requires storing of an abnormality code and allows erasure of the abnormality code when the abnormality is not detected again during the predetermined number of times of repetitions of the warm-up operation.

However, the regulation is not applicable to vehicles such as an electric vehicle and a fuel cell vehicle, which have no combustion engines. For this reason, maintenance of a vehicle is not simple.

SUMMARY

It is therefore an object to improve maintenance of an electrically-driven vehicle, which has a motor but no engine as a drive power source for vehicle travel.

According to an embodiment, an electronic control apparatus is provided for controlling an electrically-driven vehicle, which has, as a drive power source for vehicle travel, a motor supplied with electric power from an electric power supply source without an engine, and having a self-diagnosis function for storing an abnormality code corresponding to a diagnosis object when abnormality of the diagnosis object is detected. The electronic control apparatus comprises a memory, an operation check part, an abnormality check part and an erasure part. The memory stores the abnormality code indicative of the abnormality of the diagnosis object. The operation check part checks whether the motor and the electric power supply source are operating normally when a power control switch is turned on to supply electric power from the electric power supply source under a state that the abnormality code is stored in the memory. The abnormality check part checks whether abnormality is detected again in the diagnosis object, the abnormality code of which has already been stored in the memory, when the operation check part determines that both the motor and the electric power supply source are operating normally. The erasure part erases the abnormality code stored in the memory when the abnormality check part determines that no abnormality is detected again.

DETAILED DESCRIPTION

Figure 1:
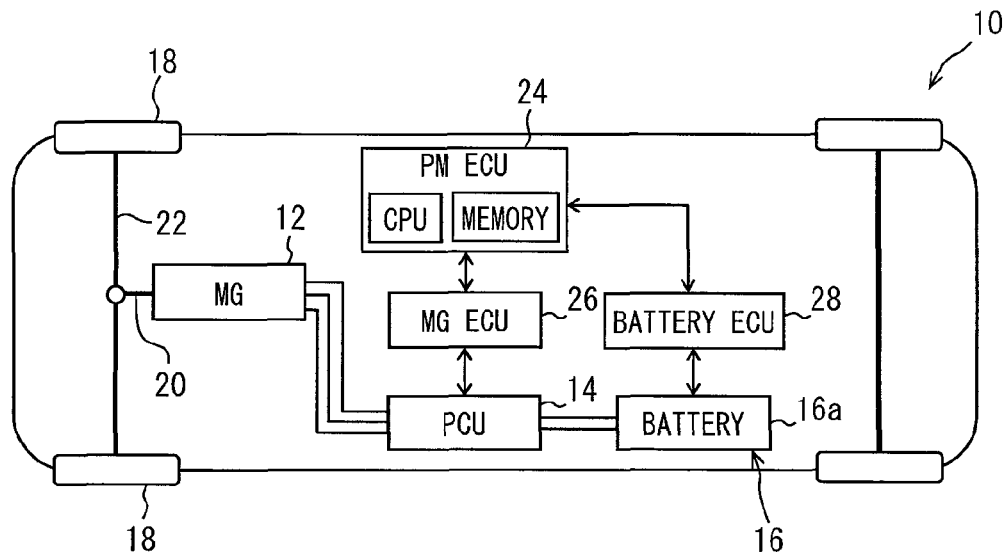
FIG. 1 is a schematic illustration of a vehicle incorporating a first embodiment.

An electronic control apparatus for a vehicle will be described below with reference to embodiments shown in the drawings. In each embodiment, same or similar components are designated with same reference numerals.

First Embodiment

A vehicle incorporating a first embodiment will be described with reference to FIG. 1. A vehicle 10 shown in FIG. 1 is an electric vehicle, which has no internal combustion engine and is driven electrically by an electric motor. This electric vehicle may be a conventional one and hence no further details will be described.

The vehicle 10 includes a motor-generator 12 (referred to as MG 12 below) for generating travel torque, a power control unit (referred to as PCU 14 below) for controlling driving of the MG 12, and an electric power supply source 16 for supplying electric power to the MG 12.

The MG 12 among those components corresponds to a motor as a drive power source for vehicle travel. The electric power supply source 16 includes a battery 16a, which is a changeable and dischargeable secondary battery. The vehicle 10 is an FF (front-engine, front-wheel) drive type, in which left and right front wheels are drive wheels 18.

The MG 12 is, for example, an AC synchronous type, which operates as both as an electric motor and an electric generator. This motor-generator 12 includes a rotor and a stator. The rotor is formed of permanent magnets. The stator is wound with three phase coils. The MG 12 has an output shaft 20, which rotates with the rotor. The output shaft 20 is coupled to a drive shaft 22 through a gear mechanism and a differential mechanism, which are not shown. The drive shaft 22 is coupled to the drive wheels 18.

The PCU 14 includes an inverter and a converter, which are not shown. The inverter may be a three-phase inverter, which are formed of Insulted gate bipolar transistors (IGBTs) and diodes. The diodes are connected in parallel to the IGBTs in reverse-biased manner, respectively. This inverter converts a DC current supplied from the battery 16a to an AC current in correspondence to a control signal from a motor-generator ECU (referred to as MG ECU below) 26, and controls driving of the MG 12 with the AC current. At the time of regenerative braking, the inverter converts the AC current generated by the MG 12 into the DC current and supplies the DC current to the battery 16a. The converter steps up a DC voltage of the battery 16a to a high voltage and supplies the stepped-up voltage to the inverter. The converter also steps down a high voltage supplied from the inverter to charge the battery 16a.

The battery 16a is connected to supply electric power to the MG 12 and stores electric power generated by the MG 12. The battery 16a may be a nickel-hydrogen battery, a lithium-ion battery and the like, which are chargeable and dischargeable. The battery 16a is provided with a connector plug, which is not shown, for use in charging by an electric power source provided at a charging station or home, for example.

The vehicle 10 further has a power management ECU 24 (referred to as PM ECU 24 below) and a battery ECU 28 in addition to the MG ECU 26. The PM ECU 24 is connected to the MG ECU 26 and the battery ECU 28 through communication buses so that an entire drive system of the vehicle 10 is controlled in an integrated manner by cooperative control by these ECUs 24, 26 and 28.

The PM ECU 24 controls the entire drive system of the vehicle 10 in the integrated manner. The MG ECU 26 controls the PCU 14 in response to a control command from the PM ECU 24. The battery ECU 28 monitors the charge state of the battery 16a and controls charging and discharging of the battery 16a. These ECUs 24, 26 and 28 are provided separately. However, at least two of the ECUs 24, 26 and 28 may be integrated into one ECU. For example, all the ECUs 24, 26 and 28 may be integrated into one ECU.

The PM ECU 24 is formed of a microcomputer as a main component. This microcomputer includes a CPU, a ROM, a RAM, a back-up RAM, an input/output interface, a communication interface and the like. The back-up RAM is a non-volatile memory (for example, SRAM), which maintains stored data even when a power control switch of the vehicle 10 is in an off-state. The power control switch corresponds to an ignition switch in an engine-powered vehicle. The PM ECU 24 is configured to calculate a travel torque of the MG 12 based on, for example, detection signals of a speed sensor and an accelerator position sensor, which are not shown.

The PM ECU 24 has a self-diagnosis function, which checks operation states of diagnosis objects (items) such as sensors and control actuators at appropriate intervals and stores an abnormality code of a diagnosis object, which is detected as being abnormal. The PM ECU 24 further has a function of erasing the abnormality code as a part of its self-diagnosis function, when a predetermined condition described below is satisfied.

The PM ECU 24 corresponds to an electronic control apparatus. However, it will suffice that the electronic control apparatus is formed of at least the PM ECU 24 among the ECUs 24, 26 and 28. For example, the electronic control apparatus may be formed of three ECUs 24, 26 and 28. In a case that the ECUs 24, 26 and 28 are integrated into a single ECU, this single ECU corresponds to the electronic control apparatus.

The MG ECU 26 also is formed of a microcomputer as a main component, similarly to the PM ECU 24. This microcomputer includes a CPU, a ROM, a RAM, a back-up RAM, an input/output interface, a communication interface and the like. The MG ECU 26 controls an operation of the PCU 14 in response to a command of torque request for the MG 12. This command is outputted from the PM ECU 24, for example. The MG ECU 26 receives information, which indicates operation states such as a current value, a rotation angle, a temperature and the like of the MG 12, from sensors (not shown). The MG ECU 26 outputs a required output torque and the like of the MG 12 to the PM ECU 24.

The battery ECU 28 also is formed of a microcomputer as a main component, similarly to the PM ECU 24. This microcomputer includes a CPU, a ROM, a RAM, a back-up RAM, an input/output interface, a communication interface and the like. The battery ECU 28 receives information such as charging and discharging currents, a voltage, a temperature and the like of the battery 16a, from sensors (not shown). The battery ECU 28 calculates a state of charge (SOC) of the battery 16a based on, for example, an integration value of the charging and discharging current, and also calculates an electric power allowed for charging and discharging the battery 16a based on the SOC and the temperature.

The battery ECU 28 outputs the information such as the SOC and the allowable electric power of the battery 16a to the PM ECU 24. The PM ECU 24 performs the abnormality code erasure processing as described below with reference to FIG. 2. The PM ECU 24 further performs the abnormality code erasure processing, when the power control switch is turned on under a state that at least one abnormality code is being stored in the back-up RAM of the PM ECU 24.

Figure 2:
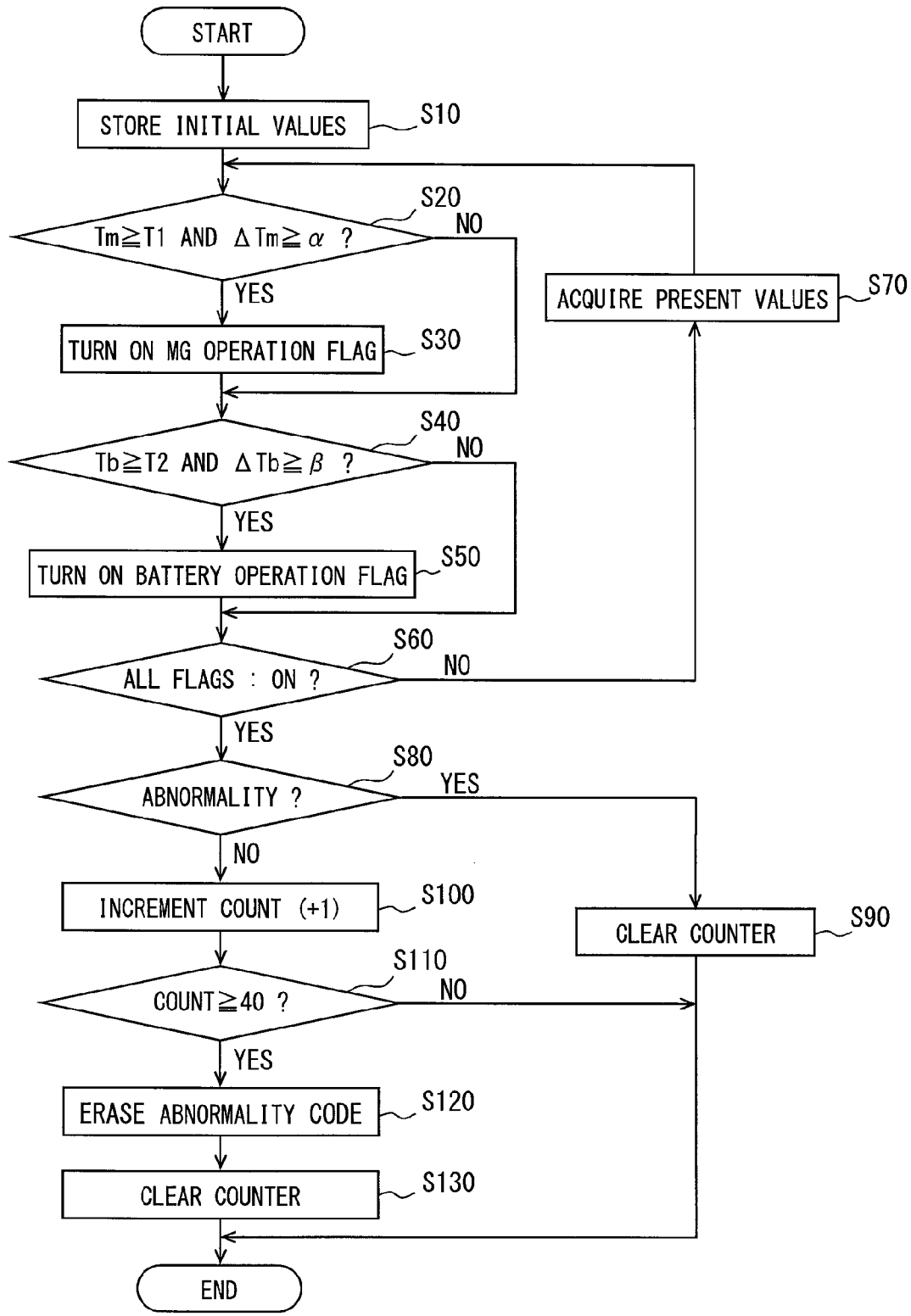
FIG. 2 is a flowchart showing abnormality code erasure processing executed in the first embodiment.

As shown in FIG. 2, the PM ECU 24, specifically its central processing unit (CPU) first stores at step S10 initial values of parameters, which are used to check whether the MG 12 and the battery 16a are operating normally. The MG 12 and the battery 16a form a vehicle drive system, which is necessary to generate drive power for vehicle travel. The PM ECU 24 acquires initial values of a temperature Tm of the MG 12 (referred to as a MG temperature Tm below) and a temperature Tb of a battery 16a (referred to as a battery temperature Tb below), which are detected immediately after the power control switch is turned on, through the MG ECU 26 and the battery ECU 28, respectively, and stores such initial values.

The PM ECU 24 then checks at step S20 whether the present value of the MG temperature Tm is equal to or higher than a first predetermined threshold temperature T1 and a temperature rise $\Delta Tm$, which is an amount of temperature increase, that is, difference between the present value of the MG temperature Tm and the initial value of the MG temperature Tm acquired at step S10, is larger than a first predetermined threshold rise $\alpha$. When the MG 12 operates normally, the MG temperature Tm rises as the MG 12 operates. The threshold temperature T1 and the threshold rise $\alpha$ are set to check whether the MG 12 is operating normally. For example, the threshold temperature T1 and the threshold rise are set to be 70° C. and 40° C., respectively.

When it is determined that the MG temperature Tm is equal to or larger than the threshold temperature T1 and the temperature rise $\Delta Tm$ is equal to or larger than the threshold rise $\alpha$, the PM ECU 24 turns on a MG operation flag at step S30 and executes step S40. When it is not determined that the MG temperature Tm is equal to or larger than the threshold temperature T1 and the temperature rise $\Delta Tm$ is equal to or larger than the threshold rise $\alpha$, the PM ECU 24 executes step S40 without turning on the MG operation flag.

When the present value equals the initial value, the MG temperature Tm is lower than the threshold temperature T1 and the temperature rise $\Delta Tm$ is zero, that is, smaller than the threshold rise $\alpha$. As a result, the PM ECU 24 executes step S40 without executing step S30.

The PM ECU 24 then checks at step S40 whether the present value of the battery temperature Tb is equal to or higher than a second predetermined threshold temperature T2 and a temperature rise $\Delta Tb$ between the present value and the initial value of the battery temperature Tb acquired at step S10 is equal to or larger than a second predetermined threshold rise β. When the battery 16a operates normally as the electric power supply source 16, the battery temperature Tb rises as the battery 16a operates. The threshold temperature T2 and the threshold rise β are set to check whether the battery 16a is operating normally. For example, the threshold temperature T2 and the threshold rise β are set to be 36° C. and 20° C., respectively.

When it is determined at step S40 that the battery temperature Tb is equal to or higher than the threshold temperature T2 and the temperature rise ΔTb is equal to or larger than the threshold rise β, the PM ECU 24 turns on a battery operation flag (S50) and executes step S60. When it is not determined at step S40 that the battery temperature Tb is equal to or higher than the threshold temperature T2 and the temperature rise ΔTb is equal to or larger than the threshold rise β, the PM ECU 24 executes step S60 without turning on the battery operation flag. When the present value equals the initial value, the temperature rise ΔTb is zero, that is, smaller than the threshold rise β, irrespective of ambient temperature (outside temperature). As a result, the PM ECU 24 executes step S60 without executing step S50.

The PM ECU 24 then checks at step S60 whether the operation flags are all in the on-state. When it is not determined that all the operation flags are in the on-state, that is, it is determined that at least one of the operation flags is not in the on-state, the PM ECU 24 acquires at step S70 the present values of the parameters described above, that is, the present value of the MG temperature Tm and the present value of the battery temperature Tb through the MG ECU 26 and the battery ECU 28. The PM ECU 24 then executes step 20 and subsequent steps to step S60 again. When the present value is equal to the initial value, the PM ECU 24 necessarily executes step S70 following step S60 unless the power control switch is turned off.

The time point of acquiring the present values at step S70 is different from the time point of storing the initial values at step S10. As steps S20 to S70 are executed repeatedly, an elapse of time from the initial value storing becomes longer. For this reason, as far as the MG 12 and the battery 16a operates normally, it is determined in the end at step S60 that all the operation flags are in the on-state even when the MG temperature Tm and the battery temperature Tb are low at time immediately after the power control switch is turned on. As described above, steps S10 to S70 correspond to the operation check part.

When it is determined at step S60 that the all of the operation flags are in the on-state, the PM ECU 24 checks at step S80 whether the abnormality is detected again in the diagnosis object, the abnormality code of which has already been stored. This step S80 corresponds to abnormality check part.

When it is determined at step S80 that the abnormality is detected, the PM ECU 24 clears at S90 its counter and resets a count value to zero. Thus the abnormality code erasure processing is finished without erasure of the abnormality code.

When it is determined at step S80 that the abnormality is not detected, the PM ECU 24 increments the count value of the counter by +1. The PM ECU 24 checks at step S110 whether the count value of the counter is equal to or larger than a predetermined count 40. When it is determined at step S110 that the count value is equal to or larger than 40, the PM ECU 24 erases at step S120 from the back-up RAM the abnormality code, which corresponds to the diagnosis object, the abnormality of which is not detected again. The PM ECU 24 then clears at step S130 the counter and finishes the abnormality code erasure processing.

The count value is incremented by only one each time the power control switch is turned on, that is, each time the vehicle 10 is used. The abnormality code is erased when the MG 12 and the battery 16a operate normally and the abnormality is not detected again during a predetermined period of 40 cycles, for example. Here, one cycle is defined to be a time interval from when the power control switch is turned on to when the power control switch is turned off. Thus steps S100 to S120 correspond to erasure part. When it is determined at step S110 that the count value is smaller than 40, the PM ECU 24 finishes the abnormality code erasure processing.

The electronic control apparatus (PM ECU 24) according to the first embodiment provides the following advantages.

When it is checked whether the vehicle system, which is essential to generate the drive power for vehicle travel, is operating normally based on only the MG 12, which generates the drive torque for travel of the vehicle 10, the MG 12 operates on a downhill road and the temperature of the MG 12 rises. It is therefore difficult to check whether the vehicle system is operating normally based on only the MG 12. When it is checked whether the vehicle system, which is essential to generate the drive power for vehicle travel, is operating normally based on only the battery 16a, which supplies the electric power for driving the MG 12, the temperature of the battery 16b rises as a result of, for example, charging the battery 16a at a charging station and power supply (discharging) from the battery 16a to accessory devices (not shown) such as a radio in the vehicle 10. It is therefore also difficult to check whether the vehicle system is operating normally based on only the battery 16a.

According to the first embodiment, on the contrary, the PM ECU 24 checks whether both the MG 12 and the battery 16a are operating normally, respectively. It is thus possible to determine that the vehicle system required to generate the drive power for vehicle travel is operating normally on condition that both the MG 12 and the battery 16a are operating normally, that is, a predetermined condition required for the normal operation is satisfied.

The PM ECU 24 then checks at step S60 whether the operation flags are all in the on-state. When it is not determined that all the operation flags are in the on-state, the PM ECU 24 acquires at step S70 the present values of the parameters described above. Specifically, when it is determined that at least one of the operation flags is not in the on-state, the PM ECU 24 acquires the present value of the MG temperature Tm, the present value of the battery temperature Tb, and the present value of the FC temperature Tf through the MG ECU 26, the battery ECU 28 and the FC ECU 32, respectively. Then the PM ECU 24 executes step S20 and the following steps described above again. For this reason, in the second embodiment, steps S10 to S70 correspond to the operation check part. Step 580 and the following steps are the same as in the first embodiment and hence no further description is made.

As described above, according to the first embodiment, the abnormality code, which has been stored as a result of temporary abnormality but does not affect the travel of the vehicle 10, can be erased in the vehicle 10 having no engine. For this reason, maintenance work is improved, that is, vehicle inspection can be simplified.

The PM ECU 24 is configured to erase the abnormality code when the MG 12 and the battery 16a operate normally and the abnormality is not detected during the period that the power control switch is turned on plural times (for example, 40). The reliability of erasure of the abnormality code can be improved.

The number of times that the power control switch is turned on is not limited to 40. By erasing the abnormality code when the MG 12 and the battery 16a operate normally and the abnormality is not detected during the period, in which the power control switch is turned on plural times, the abnormality code can be erased with higher reliability. It is however possible to omit steps S100 and S110. That is, it is possible to erase the abnormality code when it is determined at step S80 that no abnormality is detected again. In this case, only step S120 corresponds to erasure part.

Second Embodiment

An electronic control apparatus for an electrically-driven vehicle according to a second embodiment will be described next without repeating the description about the same components as the electronic control apparatus of the vehicle 10 in first embodiment.

Figure 3:
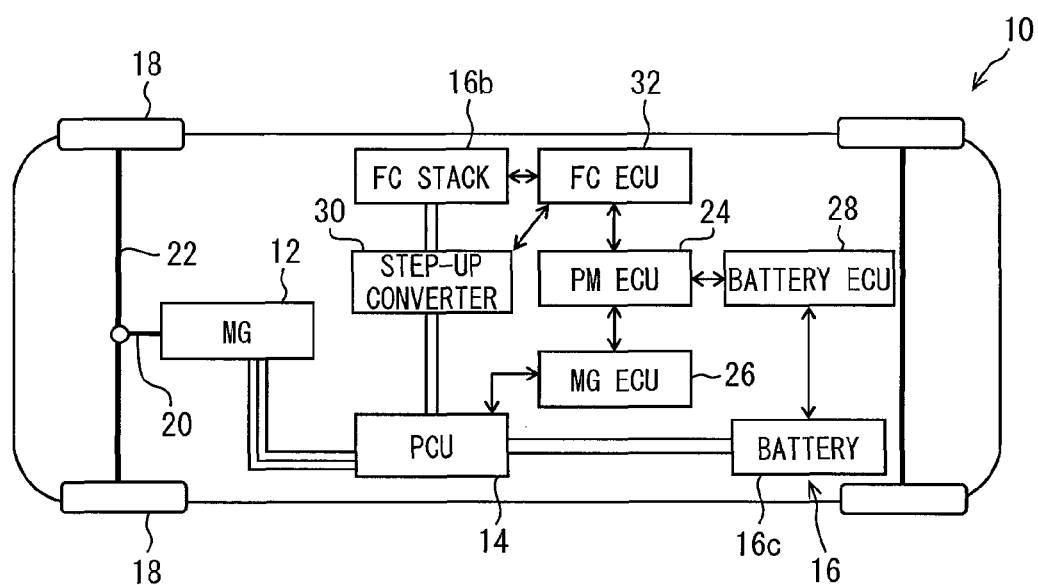
FIG. 3 is a schematic illustration of a vehicle incorporating a second embodiment.

As shown in FIG. 3, the vehicle 10 in the second embodiment is a fuel cell vehicle, which is electrically driven by an electric motor and does not have the internal combustion engine as the electric vehicle in the first embodiment did not have. Since the fuel cell vehicle may be conventional, no detail description about it will be made.

The vehicle 10 has the MG 12, the PCU 14, the electric power supply source 16, the PM ECU 24, the MG ECU 26 and the battery ECU 28 similarly to the electric vehicle shown in the first embodiment. However, the electric power source 16 has a fuel cell (FC) stack 16b and a battery 16c.

The FC stack 16b is formed of, for example, plural solid polymer electrolyte film cells, which are connected in series and stacked. This FC stack 16b corresponds to a fuel cell. In the FC stack 16b, hydrogen, for example, is supplied as fuel gas to a fuel electrode (anode) and air containing oxygen is supplied to an oxidation electrode (cathode). The hydrogen and the oxygen supplied to the electrodes are ionized by catalytic reaction and hydrogen ion and oxygen ion chemically react and produce water. The water is discharged from the FC stack 16b. When the hydrogen is ionized at the anode, electrons are discharged from the FC stack 16b as electric power. The hydrogen is supplied to the anode from, for example, a hydrogen tank, which is not shown, and the air (oxygen) is supplied to the cathode from an air compressor, which is not shown.

The battery 16c is also a secondary battery, which is chargeable and dischargeable similarly to the battery 16a in the first embodiment. The battery 16c may be, for example, a nickel-hydrogen battery or a lithium-ion battery. This battery 16c functions as a storage source for storing extra electric power generated by the FC stack 16b, a storage source for storing regeneration energy at the time of regenerative braking and a buffer for countering to electric load variations caused by acceleration and deceleration of the vehicle. That is, the battery 16c functions as an electric power supply source, which supplies electric power to the MG 12.

In addition, the vehicle 10 is provided with a step-up converter 30 and a FC ECU 32.

The step-up converter 30 boosts the output voltage of the FC stack 16b and supplies it to the PCU 14. The step-up converter 30 regulates the output voltage of the FC stack 16b to a voltage, which corresponds to a target output. The step-up converter 30 has a conventional three-phase or four-phase circuit configuration. Each phase of the step-up converter 30 is formed of a reactor, a rectifying diode, a switching element such as an IGBT. The inverter of the PCU 14 converts the DC current, which is supplied from the FC stack 16b through the step-up converter 30, to the AC current.

The FC ECU 32 also includes a microcomputer as a main component similarly to the PM ECU 24. The microcomputer is formed of a CPU, a ROM, a RAM, a backup RAM, an input/output interface, a communication interface and the like. The FC ECU 32 regulates the output voltage of the FC stack 16b by controlling the step-up converter 30. The FC ECU 32 receives information such as discharge current, voltage, and temperature of the FC stack 16b from sensors, which are not shown.

Similarly to the first embodiment, the PM ECU 24 has a self-diagnosis function and calculates a torque required for vehicle travel. The PM ECU 24 determines portions (rate of distribution) of the output powers, which the FC stack 16b and the battery 16c share, respectively, and calculates command values of the output powers. The command values are outputted to the MG ECU 26 and the FC ECU 32. The MG ECU 26 and the FC ECU 32 control operations of the converter of the PCU 14 and the step-up converter 30, so that the converters generate the electric powers corresponding to the required powers, respectively. The MG ECU 26 further outputs a control signal to the inverter of the PCU 14 so that the inverter generates a target torque corresponding to an accelerator operation.

The PM ECU 24 determines to which one of the MG 12 and the battery 16c and how much portion of the electric power generated by the FC stack 16b should be distributed. The PM ECU 24 further determines to which one of the MG 12 and other accessory devices (not shown) and how much portion of the electric power stored in the battery 16c should be distributed.

In the second embodiment, the ECUs 24, 26, 28 and 32 are provided separately. However, at least two of the ECUs 24, 26, 28 and 32 may be integrated into one ECU. For example, all ECUs 24, 26, 28 and 32 may be integrated into one ECU. Further, the FC ECU 32 may be integrated with the PM ECU 24.

Figure 4:
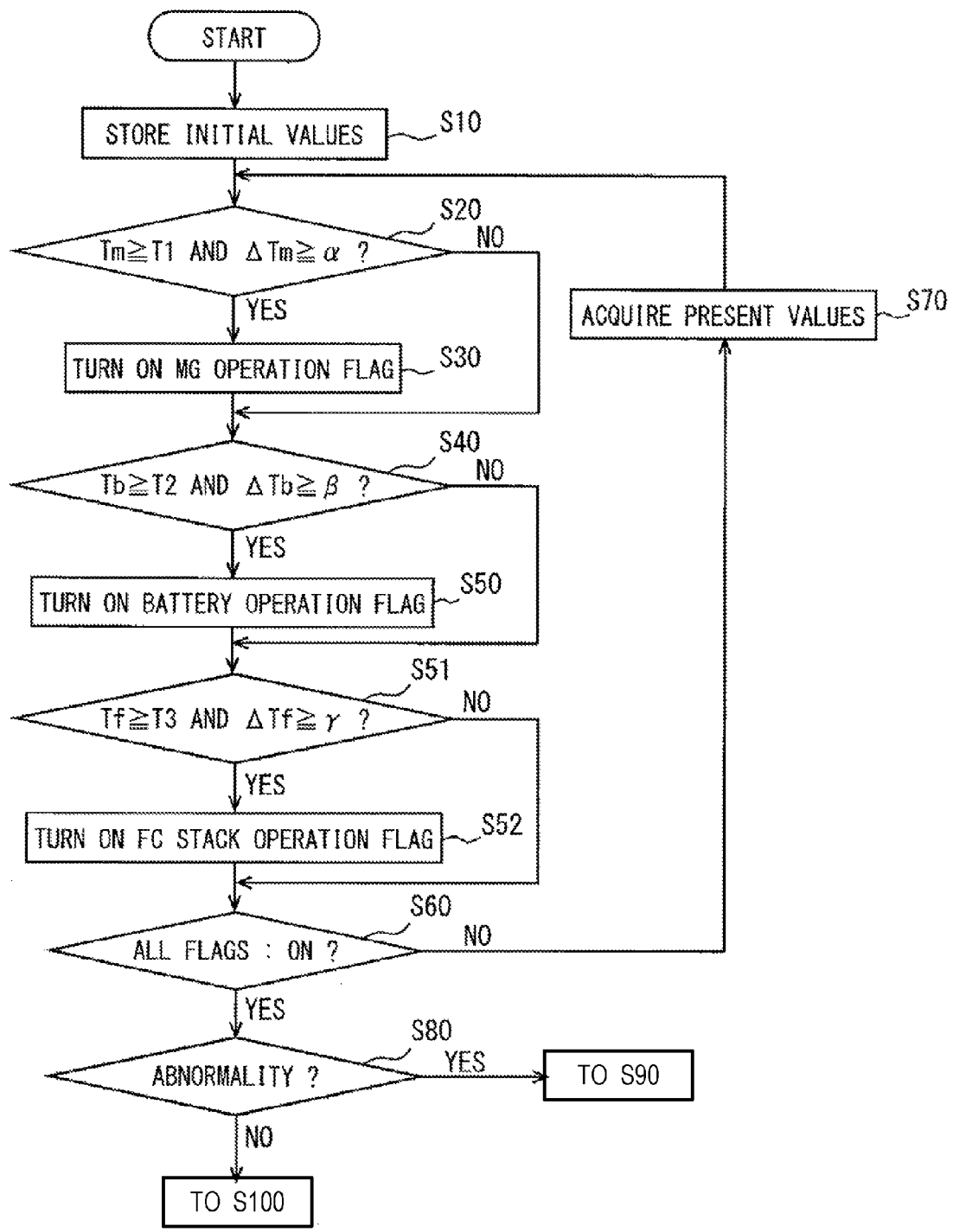
FIG. 4 is a flowchart showing abnormality code erasure processing executed in the second embodiment.

The PM ECU 24 performs the abnormality code erasure processing as described below with reference to FIG. 4. In FIG. 4, steps following step S90 to S130 are not shown for simplicity.

As shown in FIG. 4, the PM ECU 24 first stores at step S10 initial values. In the present embodiment, the vehicle 10 is a fuel cell vehicle, in which components forming a vehicle system essential to generate drive power for travel are the MG 12 for generating the travel torque, the FC stack 16b and the battery 16c for supplying the electric power to the MG 12 for operation. For this reason, the initial values of parameters for checking whether the MG 12, the FC stack 16b and the battery 16c are operating normally immediately after the power control switch is turned on are stored. Specifically, the PM ECU 24 acquires the initial value of the MG temperature Tm, the initial value of the battery temperature Tb and the initial value of a temperature Tf of the FC stack 16b (referred to as a FC temperature Tf below) through the MG ECU 26, the battery ECU 28 and the FC ECU 32 and stores those initial values.

Steps S20 to S50 are basically the same as in the first embodiment. In the second embodiment, however, the battery 16c corresponds to the battery 16a in the first embodiment.

The PM ECU 24 then checks at step S51 whether the present value of the FC temperature Tf is equal to or higher than a third predetermined threshold temperature T3 and a temperature rise $\Delta$Tf, which is a difference between the present value of the FC temperature and the initial value of the same acquired at step S10, is larger than a third predetermined threshold rise γ. When the FC stack 16b operates normally, the temperature of the FC stack 16b rises as it operates. The threshold temperature T3 and the threshold rise γ are set to check whether the FC stack 16b is operating normally. For example, the threshold temperature T3 and the threshold rise γ are set to be 36° C. and 20° C., respectively.

When it is determined at step S51 that the FC temperature Tf is equal to or higher than the threshold temperature T3 and the temperature rise ΔTf is equal to or larger than the threshold rise γ, the PM ECU 24 turns on a FC stack operation flag at step S52 and executes step S60. When it is not determined at step S51 that the FC temperature Tf is equal to or higher than the threshold temperature T3 and the temperature rise ΔTf is equal to or larger than the threshold rise γ, the PM ECU 24 executes step S60 without turning on the FC stack operation flag. When the present value equals the initial value, the temperature rise ΔTf is zero, that is, smaller than the threshold rise γ, irrespective of the ambient temperature (outside temperature). As a result, the PM ECU 24 executes step S60 without executing step S52.

The PM ECU 24 then checks at step S60 whether the operation flags are all in the on-state. When it is not determined that all the operation flags are in the on-state, the PM ECU 24 acquires at step S70 the present values of the parameters described above. Specifically, when it is determined that at least one of the operation flags is not in the on-state, the PM ECU 24 acquires the present value of the MG temperature Tm, the present value of the battery temperature Tb, and the present value of the FC temperature Tf through the MG ECU 26, the battery ECU 28 and the FC ECU 32, respectively. Then the PM ECU 24 executes step S20 and the following steps described above again. For this reason, in the second embodiment, steps S10 to S70 correspond to operation check part. Step 580 and the following steps are the same as in the first embodiment and hence no further description is made.

The electronic control apparatus (PM ECU 24) according to the second embodiment provides the following advantage.

The PM ECU 24 checks whether the MG 12, the FC stack 16b and the battery 16c are operating normally, respectively. It is thus possible to check whether the vehicle system required to generate the drive power for vehicle travel is operating normally on condition that all of the MG 12, the FC stack 16b and the battery 16c are operating normally, that is, a predetermined condition required for the normal operation is satisfied.

The PM ECU 24 further checks whether the abnormality of the diagnosis object, the abnormality code of which has been stored previously, is detected again, when the MG 12, the FC stack 16b and the battery 16c are determined to be operating normally. When the abnormality is not detected again, the corresponding abnormality code is erased.

As described above, according to the second embodiment, the abnormality code, which has been stored as a result of temporary abnormality but does not affect the travel of the vehicle 10, can be erased in the vehicle 10 (fuel cell vehicle) having no engine. For this reason, maintenance work for the vehicle 10 is improved, that is, vehicle inspection can be simplified.

The electronic control apparatus described above is not limited to the preferred embodiments but may be implemented in different embodiments.

In the above-described embodiments, the temperature and the temperature rise are exemplarily used as the parameters for checking whether the vehicle system essential for drive power generation is operating normally. However, other parameters, which are different from the temperature and the temperature rise, may be used. For example, as the other parameters of the MG 12, a torque demand value to the MG 12 and an integration value of an actual rotation speed of the MG 12 or the amount of electric power generated by the MG 12 at the time of regenerative braking may be used. In a case that a rotation speed is used singly as the parameter, the rotation speed value varies when it idles on a descending slope, for example. In a case that a rotation torque is used as the parameter, a torque is generated when downward movement is suppressed on an ascending slope, for example. In these cases, it is likely that the operation of the vehicle system is erroneously determined.

Further, as the parameters of the batteries 16a and 16c, integration values of the charging and discharging may be used. Further, as the parameter of the FC stack 16b, an integration value of the charging may be used.

That is, as the parameter of the MG 12, any one of the temperature, the temperature rise, torque demand value to the MG 12 and the integration value of the actual rotation speed of the MG 12, and the amount of electric power generated by the MG 12 at the time of regenerative braking may be used. As the parameters of the batteries 16a and 16c, any one of the temperature, the temperature rise and the integration value of the charging and discharging may be used. As the parameter of the FC stack 16b, any one of the temperature, the temperature rise and the integration value of the discharging of the FC stack 16b may be used. Therefore, the parameter of the MG 12 may be the temperature and the temperature rise, the parameters of the batteries 16a and 16c may be the integration values of charging and discharging, and the parameter of the FC stack 16b may be the integration value of the discharging. It is also possible to switch over the parameters of the batteries 16a and 16c at predetermined time points from the temperature and the temperature rise to the integration value of the charging and discharging. The parameters of the MG 12 and the FC stack 16b may also be switched over similarly.

What is claimed is:

1. An electronic control apparatus for controlling an electrically-driven vehicle, which has, as a drive power source for vehicle travel, a motor supplied with electric power from an electric power supply source without an engine, and having a self-diagnosis function for storing an abnormality code corresponding to a diagnosis object in the vehicle when abnormality of the diagnosis object is detected, the electronic control apparatus comprising:

a memory for storing the abnormality code indicative of the abnormality of the diagnosis object; and a processor, the processor is configured to check whether the motor and the electric power supply source are both operating normally when a power control switch is turned on to supply electric power from the electric power supply source under a state that the abnormality code is stored in the memory;

responsive to determining that both the motor and the electric power supply source are operating normally, check whether abnormality is detected again in the diagnosis object, the abnormality code of which has already been stored in the memory;

responsive to determining that no abnormality is detected again, erase the abnormality code stored in the memory, responsive to determining that at least one of the motor and the electric power supply source are not operating normally,
(i) repeatedly execute said check as to whether the motor and the electric power supply source are both operating normally until the motor and the electric power supply source are both determined to be operating normally, and (ii) do not execute the check of whether the abnormality is detected again in the diagnosis object, the abnormality code of which has already been stored in the memory;
the electric power supply source is a battery, which is chargeable and dischargeable,
whether the motor is operating normally is checked based on either one of a temperature of the motor, and a temperature rise of the motor after the power control switch is turned on, and
whether the electric power supply source which is the battery is operating normally is checked based on one of a temperature of the battery, a temperature rise of the battery after the power control switch is turned on, and an integration value of electric charging and discharging amount of the battery.

2. The electronic control apparatus according to claim 1, the processor is further configured to erase the abnormality code stored in the memory when it is determined that no abnormality is detected again during a period, in which the power control switch is turned on a predetermined number of times.

3. The electronic control apparatus according to claim 1, the vehicle is an electric vehicle.

4. The electronic control apparatus according to claim 1, the vehicle is a fuel cell vehicle having a fuel cell.

5. The electronic control apparatus according to claim 4, the processor is further configured to check whether the fuel cell is operating normally based on either one of a temperature of the fuel cell, a temperature rise of the fuel cell after the power control switch is turned on, and an integration value of a discharge quantity of the fuel cell.

6. The electronic control apparatus according to claim 1, the processor is further configured to check whether the motor is operating normally based on one of (i) a parameter of the motor, wherein the parameter is a torque demand value to the motor, and (ii) an integration value of power generated by regenerative braking of the motor.

7. The electronic control apparatus according to claim 1, the processor is a microcomputer in an electronic control unit of the electrically-driven vehicle.

8. The electronic control apparatus according to claim 1, wherein:
the processor is further configured to determine that the motor is operating normally when respective predetermined threshold values are exceeded by both of: the temperature of the motor, and the temperature rise of the motor.

9. The electronic control apparatus according to claim 1, wherein:
the processor is further configured to determine that the battery is operating normally when respective predetermined threshold values are exceeded by all of: the temperature of the motor, the temperature rise of the motor, the temperature of the battery, the temperature rise of the battery, and the integration value of electric charging and discharging amount of the battery.

10. The electronic control apparatus according to claim 1, wherein:
the processor is further configured to determine that the battery is operating normally when respective predetermined threshold values are exceeded by all of: the temperature of the battery, the temperature rise of the battery, and the integration value of electric charging and discharging amount of the battery.

11. The electronic control apparatus according to claim 1, wherein the processor is further configured to:
initialize, responsive to the power control switch being turned on to supply electric power from the electric power supply source, a motor operation flag and a battery operation flag;
after initializing the motor operation flag and the battery operation flag:
when the motor is operating normally based on the either one of the temperature of the motor, and the temperature rise of the motor after the power control switch is turned on, set the motor operation flag to indicate operating normally; and
when the electric power supply source which is the battery is operating normally based on the one of the temperature of the battery, the temperature rise of the battery after the power control switch is turned on, and the integration value of electric charging and discharging amount of the battery, set the battery operation flag to indicate that the electric power supply source is operating normally;
wherein the check as to whether the motor and the electric power supply source are operating normally is based on the motor operation flag and the battery operation flag.

* * * * *